Figure 1:
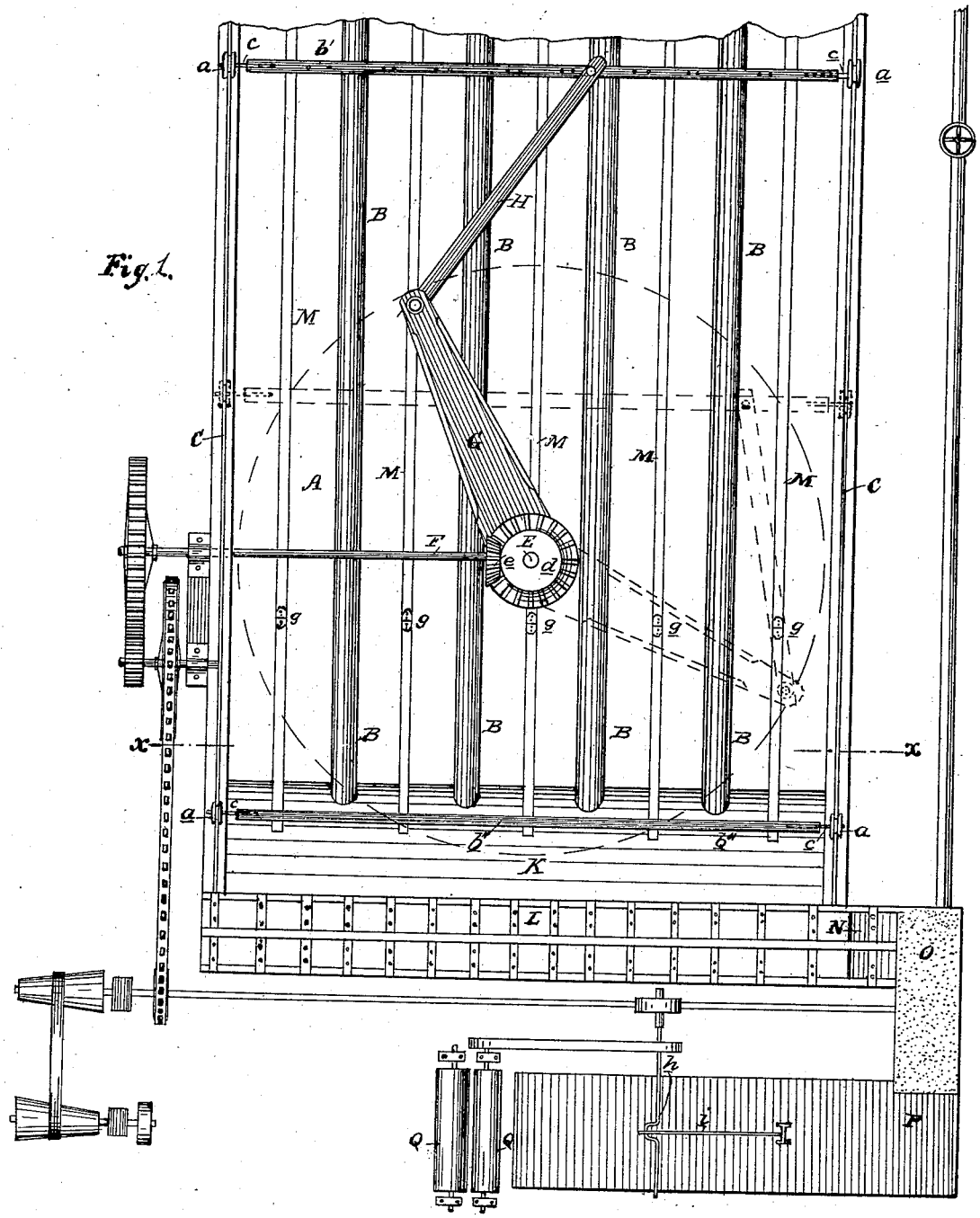

(No Model.) 2 Sheets—Sheet 1.

A. JOHNSON.
PROCESS OF MANUFACTURING SALT.

No. 267,085. Patented Nov. 7, 1882.

Witnesses
A. B. Robertson.
Wm Turner

Inventor:
Andrew Johnson
By T. J. W. Robertson
Attorney.

(No Model.) 2 Sheets—Sheet 2.
A. JOHNSON.
PROCESS OF MANUFACTURING SALT.
No. 267,085. Patented Nov. 7, 1882.
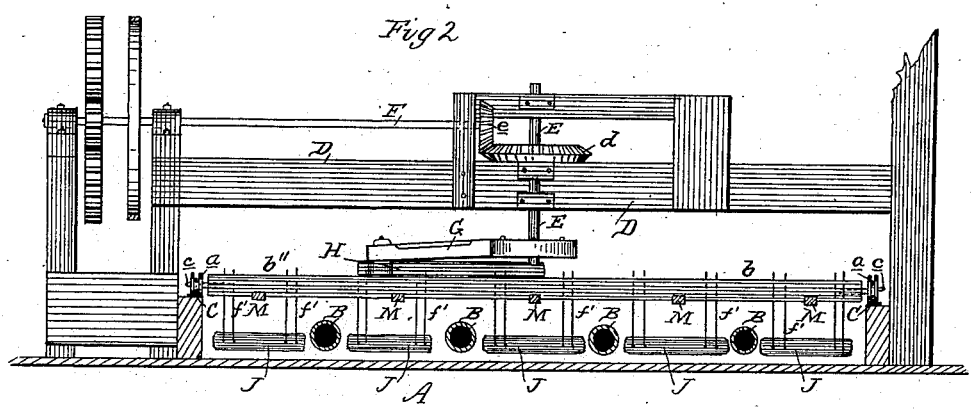
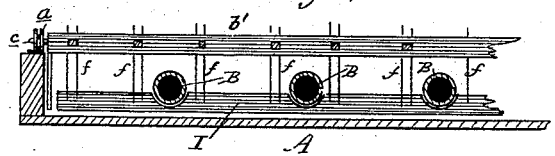
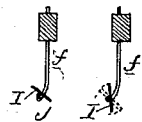

UNITED STATES PATENT OFFICE.

ANDREW JOHNSON, OF SAGINAW, ASSIGNOR OF ONE-HALF TO JAMES W. PERRIN, OF EAST SAGINAW, MICHIGAN.

PROCESS OF MANUFACTURING SALT.

SPECIFICATION forming part of Letters Patent No. 267,085, dated November 7, 1882.

Application filed July 8, 1882. (No model.)

*To all whom it may concern:*

Be it known that I, ANDREW JOHNSON, of Saginaw, in the county of Saginaw and State of Michigan, have invented new and useful Improvements in Machinery for the Manufacture of Salt; and I do hereby declare that the following is a full, clear, and exact description thereof, reference being had to the accompanying drawings, which form a part of this specification.

The nature of this invention relates to certain new and useful improvements in mechanism to be employed in the manufacture of salt, in combination with grainers of the ordinary construction, wherein close steam is carried through said grainers in pipes to evaporate the brine. As such grainers are now used, the labor of removing the salt is very exacting, and, as there is generally no means provided for agitating the brine, grease of some kind is floated in a melted condition on top of the brine to cut the grain of the salt as the latter rises to the surface, after which it is precipitated to the bottom of the grainer, whence it must be frequently removed.

The object of my invention is to provide such mechanical devices as will produce sufficient agitation of the brine as to avoid the necessity of using grease, and at the same time automatically remove the salt from the grainer to a point where it may be washed free of bitter water with saturated brine, and thence in succession to a drier, and, if desired, to a grinder, such removal and successive steps being automatically carried on, and allowing the process to be continuous so long as brine is supplied to the grainer.

Figure 1 is a plan view of a salt-grainer of the ordinary construction provided with my improvements. Fig. 2 is a vertical cross-section of the same on the line $x$ $x$ in Fig. 1. Fig. 3 is a section showing the operation of my scrapers for removing the salt from below the steam-pipes in the grainer. Fig. 4 is a detail showing a simple method of hanging the scrapers so that they will automatically change their position with a reversal in their direction of travel.

In the accompanying drawings, which form a part of this specification, A represents a salt-grainer of the usual construction. Such grainers are usually about ten feet wide, from one to two hundred feet long, and sixteen inches deep, and have four steam-pipes, B, running through them a little distance above the bottom of the grainer, through which steam is carried to raise the brine to an evaporating-point.

Upon the top of the sides of the grainer, and along its entire length, the track C is secured. This track may be made of any suitable material. Upon this track are placed a series of trucks, one being employed for each ten feet in length of the grainer. These trucks consist of the grooved wheels $a$ and axles $b$, which, however, do not revolve, but are provided with arms $c$, upon which the wheels revolve. Preferably there are three of these axles, equidistant from each other.

A beam, D, suitably secured above the grainer, supports a vertical shaft, E, upon which is secured the bevel-wheel $d$, which engages with a bevel-pinion, $e$, upon the counter-shaft $f$, to which motion is communicated from any suitable power.

To the bottom of the shaft E is secured the crank G, to the outer end of which is pivotally secured the link H, the opposite end of which is pivotally secured to the axle $b'$ of the truck, these parts being so arranged as to compel the truck to travel to and fro on its track its own length. Each of the trucks employed is provided with this device for giving them their reciprocating motion, and a truck must be provided for each ten feet in length of the grainer; or, if preferred, the trucks may be made shorter, so long as there are a sufficient number of them to clear the whole length of the grainer.

Suspended from the rear and middle axles of the truck are a series of link-shaped hangers, $f$, and to the front axle, $b''$, are secured a similar series of hangers, $f'$.

To the hangers $f$ there is secured the scraper I, which extends across the grainer from side to side, its top edge being cut out, as shown in Fig. 3, to partially embrace the steam-pipes, while its lower edge rests in close proximity to the bottom of the grainer. These scrapers are so secured to their hangers that when the truck is traveling from the head of the grainer they will hang so loosely that they will pass over the salt in the grainer, changing their position, as shown in the left-hand detail shown in Fig. 4, and so that when the truck is traveling toward the head of the grainer they will assume a vertical position and scrape the salt forward with their advance. This may be done in various ways; but the one shown is perhaps the most economical way, and is very effective. To the hangers $f'$, and so as to travel between the steam-pipes, there are similarly hung a series of single scrapers, J, by means of which the salt brought forward by the scrapers I is drawn up onto the inclined way K, which is fitted to the head of the grainer.

All the trucks should be constructed alike, and so arranged that the salt brought forward by each is delivered to the one in front, so that the truck nearest the head of the grainer will draw the salt out onto the inclined way K, whence it is forced by the continuance of this operation into the washing-trough L. It is not essential that these several scrapers be attached to the axles, as it is evident that they may be attached to the frame of the truck with the same effect, provided they are so arranged as to perform as described. The longitudinal bars M of the truck are each made in two pieces and hinged together at $g$ to allow the forward scrapers to travel up the inclined way. When the salt has thus been deposited in the trough it is washed with saturated brine to free it from the bitters, and the trough is provided with scrapers and devices for moving them, similar to those already described for forcing the salt onto the inclined way of the grainers, and, after being washed, the salt is forced by these scrapers up onto the inclined way N at the head of the trough L, whence it is forced into the drainer O, one end of which overlaps the pan P, into which the salt is gradually forced by the means employed for forcing it into the grainer. This pan is heated by steam below its bottom in any convenient manner, and it has a reciprocating motion by means of the crank $h$ and pitman $i$ and suitable connections with power. As the salt is dried it is delivered through the open end of this pan to the rollers Q, or other suitable apparatus, by means of which it is ground to any desired degree of fineness.

I do not desire to confine myself to the precise construction of parts described, for these constructions may be varied in many ways to produce like results without departing from the spirit of my invention. Neither do I wish to claim any peculiar method of giving motion to the various operating parts, as these may be driven separately from any convenient source; or, by a good mechanical arrangement of shafts, belts, and pulleys, they may all be driven from one main shaft. The design of my invention is to substitute mechanism to prevent the necessity of employing so much hand-labor as is now required in the manufacture of salt, and by the use of such mechanical devices render the cost of production much less than when produced in the present crude way, while I am enabled to make a very much purer article.

What I claim as my invention, and desire to secure by Letters Patent, is—

1. In a steam salt-grainer, pivoted scrapers adapted to automatically force the salt in one direction and to rigidly back over the salt, as and for the purposes set forth.

2. The pivoted scraper I J, combined with the truck and with connections G H to the power-shaft, as and for the purposes set forth.

3. In combination with a salt-grainer having an inclined plane at the head and with a washing-trough adjacent to the top of said incline, mechanical appliances, substantially as described, for forcing the salt from the grainer up the incline and into the washing-trough into a drainer automatically and continuously, as specified.

4. In combination with a salt-grainer having an incline at the head, a washing-trough having an incline and a drainer adjacent thereto, a drying-pan having a reciprocating motion, and mechanical means, substantially as described and shown, for automatically forcing the grained salt from the grainer to the drainer, as described.

5. In combination with a salt-grainer and washing-trough and means for automatically forcing the salt from the former to and past the latter, a drainer, a drying-pan, and a pair of adjustable rolls for grinding the salt more or less fine, all working automatically, as and for the purposes set forth.

6. The grainer A, having tracks C and incline K, combined with the trough L, having incline N, combined with a truck, M, operating means E G H, and the scrapers, as set forth.

7. The hinged truck M $g$ and grainer A, having tracks C and incline K, combined with the shaft E, arm G, link H, bars $b'$ $b''$, and pivoted scrapers I J, as and for the purpose set forth.

8. The combination of the grainer A, having incline K, truck M $g$, and scrapers I J, the operating mechanism therefor, the washing-trough L, having scrapers and incline, the drainer O, reciprocating drier P, and grinding-rolls Q, all constructed, arranged, and adapted to serve as and for the purposes set forth.

ANDREW JOHNSON.

Witnesses:
E. SCULLY,
H. S. SPRAGUE.